United States Patent
Wang (10) Patent No.: US 9,154,334 B2
(45) Date of Patent: Oct. 6, 2015

(54) APPARATUS MANAGEMENT DEVICE, APPARATUS CONFIGURATION METHOD, AND STORAGE MEDIUM

(75) Inventor: Weibo Wang, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 252 days.

(21) Appl. No.: 13/349,645

(22) Filed: Jan. 13, 2012

(65) Prior Publication Data

US 2012/0191827 A1 Jul. 26, 2012

(30) Foreign Application Priority Data

Jan. 20, 2011 (JP) ................................ 2011-009891

(51) Int. Cl.
*G06F 15/177* (2006.01)
*H04L 12/64* (2006.01)

(52) U.S. Cl.
CPC .................................. *H04L 12/6418* (2013.01)

(58) Field of Classification Search
CPC .................................................. H04L 12/6418
USPC .................. 709/224, 223, 220–222; 358/1.15
See application file for complete search history.

(56) References Cited

U.S. PATENT DOCUMENTS 8,284,421 B2 * 10/2012 Lee ............................... 358/1.15
8,432,561 B2 * 4/2013 Ebisui ........................... 358/1.14
2004/0141487 A1 * 7/2004 Lee ................................ 370/338
2008/0320136 A1 * 12/2008 Holt et al. ...................... 709/224
2010/0315665 A1 * 12/2010 Ebisui ........................... 358/1.14

FOREIGN PATENT DOCUMENTS

| JP | 2003-271398 | 9/2003 |
| JP | 2005-094633 | 4/2005 |
| JP | 2008-003186 | 1/2008 |
| JP | 2008-191878 | 8/2008 |
| JP | 2009-205062 | 9/2009 |
| JP | 2009-300510 | 12/2009 |
| JP | 2010-193320 | 9/2010 |

OTHER PUBLICATIONS

Japanese Office Action dated Mar. 10, 2015.
Japanese Office Action dated Dec. 9, 2014.

* cited by examiner

*Primary Examiner* — Kenneth R Coulter
(74) *Attorney, Agent, or Firm* — IPUSA, PLLC (57) ABSTRACT

An apparatus management device, which is connected via a network to an apparatus, includes a storage unit configured to store a default value for a parameter of the apparatus and a table including coefficients associated with counter values indicating operational status of the apparatus; an apparatus information obtaining unit configured to obtain apparatus information including a counter value indicating the operational status from the apparatus; a parameter value calculation unit configured to obtain one of the coefficients that corresponds to the counter value in the obtained apparatus information by referring to the table, and to calculate an update value for the parameter of the apparatus by multiplying the default value by the one of the coefficients; and a setting unit configured to set the parameter of the apparatus at the update value.

8 Claims, 8 Drawing Sheets

| APPARATUS ID | TOTAL COUNTER | COPY TOTAL | PRINT TOTAL | SCAN TOTAL | FAX TOTAL |
|---|---|---|---|---|---|
| K00011 | 26623 | 12229 | 8889 | 5462 | 43 |
| K00012 | 873909 | 298566 | 575343 | 78557 | 0 |
| K00013 | 15827 | 2112 | 13715 | 372 | 0 |

FIG.5

| APPARATUS ID | DATE OF OCCURRENCE | CALL TYPE ID | CALL TYPE |
|---|---|---|---|
| K00011 | 2011/1/5 | SC201 | SCAN |
| K00011 | 2011/2/3 | SC203 | PRINT |
| K00013 | 2011/2/9 | SC202 | COPY |
| K00011 | 2011/2/20 | SC595 | FAX |

FIG.6

| NUMBER OF PAGES PRINTED | NUMBER OF FAILURES | COEFFICIENT |
|---|---|---|
| .. | .. | .. |
| ~4000 | 0 | 1 |
|  | 2 OR MORE | 1.1 |
| ~6000 | 0 | 1.2 |
|  | 2 OR MORE | 1.3 |
| ~8000 | 0 | 1.4 |
|  | 2 OR MORE | 1.5 |
| ~10000 | 0 | 1.6 |
|  | 2 OR MORE | 1.7 |
| .. | .. | .. |

FIG.7

| PARAMETER NAME | VALUE |
|---|---:|
| PARAMETER A | 0.5 |
| PARAMETER B | 1 |
| PARAMETER C | 100 |
| : | : |

FIG.8

APPARATUS MANAGEMENT DEVICE, APPARATUS CONFIGURATION METHOD, AND STORAGE MEDIUM

CROSS-REFERENCE TO RELATED APPLICATION

The present application is based upon and claims the benefit of priority of Japanese Patent Application No. 2011-009891, filed on Jan. 20, 2011, the entire contents of which are incorporated herein by reference.

BACKGROUND OF THE INVENTION

1. Field of the Invention

An aspect of this disclosure relates to an apparatus management device, an apparatus configuration method, and a storage medium.

2. Description of the Related Art

There is a known apparatus management system where an apparatus management device obtains information on apparatuses and configures the apparatuses via a network. When there are a large number of apparatuses to be managed, separately setting parameters (settings) of the apparatuses causes a heavy workload. Using an apparatus management device makes it possible to remotely set the same parameters of multiple apparatuses at the same time and thereby makes it possible to reduce the workload.

In such an apparatus management system, an administrator prepares a configuration file and requests the apparatus management device to apply the configuration file to the apparatuses one by one or at the same time. After the configuration file is applied, the apparatuses operate according to parameters defined in the configuration file. Thus, with an apparatus management device, the administrator can easily install and manage a large number of apparatuses.

Japanese Laid-Open Patent Publication No. 2005-094633, for example, discloses a communication apparatus configuration method for specifying, via a network, parameters of one or more communication apparatuses that send and receive image information. The disclosed method includes steps of searching the network, via the simple network management protocol (SNMP), to find communication apparatuses to be configured and configuring the found communication apparatuses via the simple object access protocol (SOAP).

In related-art technologies, the same values are specified for the parameters of all apparatuses at the same time. However, optimum values of parameters may differ from one apparatus to another. Also, optimum values of parameters for an apparatus may change after the apparatus is put into operation depending on, for example, the operational status or the usage status of the apparatus.

Assuming a case where a digital multifunction peripheral installed in a department of a company is very frequently used and a digital multifunction peripheral installed in another department is less frequently used, optimum values of some parameters of the digital multifunction peripherals may differ depending on their usage frequencies. With related-art technologies where the same values are specified for the parameters of all apparatuses at the same time, it is not possible to automatically specify or change values of the parameters to suit respective apparatuses.

Here, since it is difficult to estimate the operational status or the usage status of apparatuses when they are installed, it may be practical to specify the same values for the parameters of the apparatuses at the beginning. Meanwhile, after a certain period of time from when the apparatuses are put into operation, it is preferable to specify or change values of the parameters to suit the respective apparatuses depending on the operational status or the usage status.

SUMMARY OF THE INVENTION

In an aspect of this disclosure, there is provided an apparatus management device connected via a network to an apparatus. The apparatus management device includes a storage unit configured to store a default value for a parameter of the apparatus and a table including coefficients associated with counter values indicating operational status of the apparatus; an apparatus information obtaining unit configured to obtain apparatus information including a counter value indicating the operational status from the apparatus; a parameter value calculation unit configured to obtain one of the coefficients that corresponds to the counter value in the obtained apparatus information by referring to the table, and to calculate an update value for the parameter of the apparatus by multiplying the default value by the one of the coefficients; and a setting unit configured to set the parameter of the apparatus at the update value.

DESCRIPTION OF THE PREFERRED EMBODIMENTS

Preferred embodiments of the present invention are described below with reference to the accompanying drawings.

<System Configuration>

Figure 1:
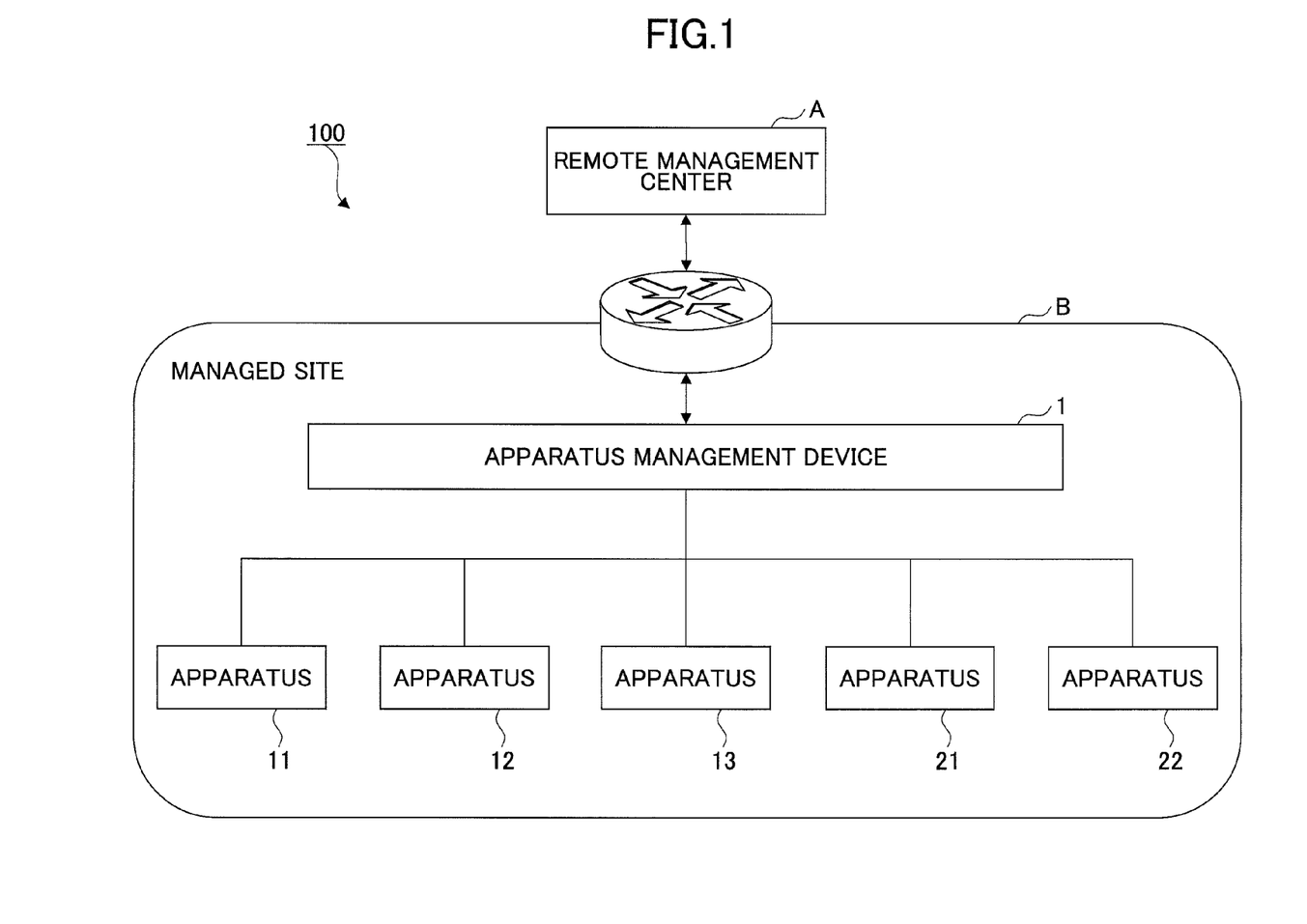
FIG. 1 is a drawing illustrating an exemplary configuration of an apparatus management system according to an embodiment.

FIG. 1 is a drawing illustrating an exemplary configuration of an apparatus management system 100 according to an embodiment. As illustrated in FIG. 1, the apparatus management system 100 may include a remote management center A and a managed site B that are connected to each other via a network. The managed site B may include an apparatus management device 1 and apparatuses connected to the apparatus management device 1.

Here, it is assumed that maintenance personnel are resident at the remote management center A to remotely monitor and manage one or more managed sites B of clients with maintenance contracts. The maintenance personnel routinely obtain and accumulate information for the management of apparatuses from the apparatus management device 1 installed in the managed site B, and thereby monitor the status of the apparatuses to prepare for the failure.

The apparatus management device 1 routinely obtains status information from the apparatuses in the managed site B, manages and stores the status information, and sends the status information to the remote management center A. Also, as described later, the apparatus management device 1 configures and reconfigures the apparatuses.

The apparatuses in the managed site B are remotely monitored and managed by the maintenance personnel at the remote management center A and/or the administrator (of, for example, the client) at the managed site B, and operate according to parameters (or settings) specified. The parameters of the apparatuses can be changed remotely and directly.

In the example of FIG. 1, the managed site B includes apparatuses 11, 12, 13, 21, and 22 (may be simply called "apparatuses" when distinction is not necessary). Here, it is assumed that the apparatuses 11, 12, and 13 are the same model, and the apparatuses 21 and 22 are the same model. Also, for descriptive purposes, it is assumed that the apparatuses 11, 12, 13, 21, and 22 are digital multifunction peripherals including functions of a scanner, a copier, a printer, and a facsimile machine.

<Hardware Configuration>

Figure 2:
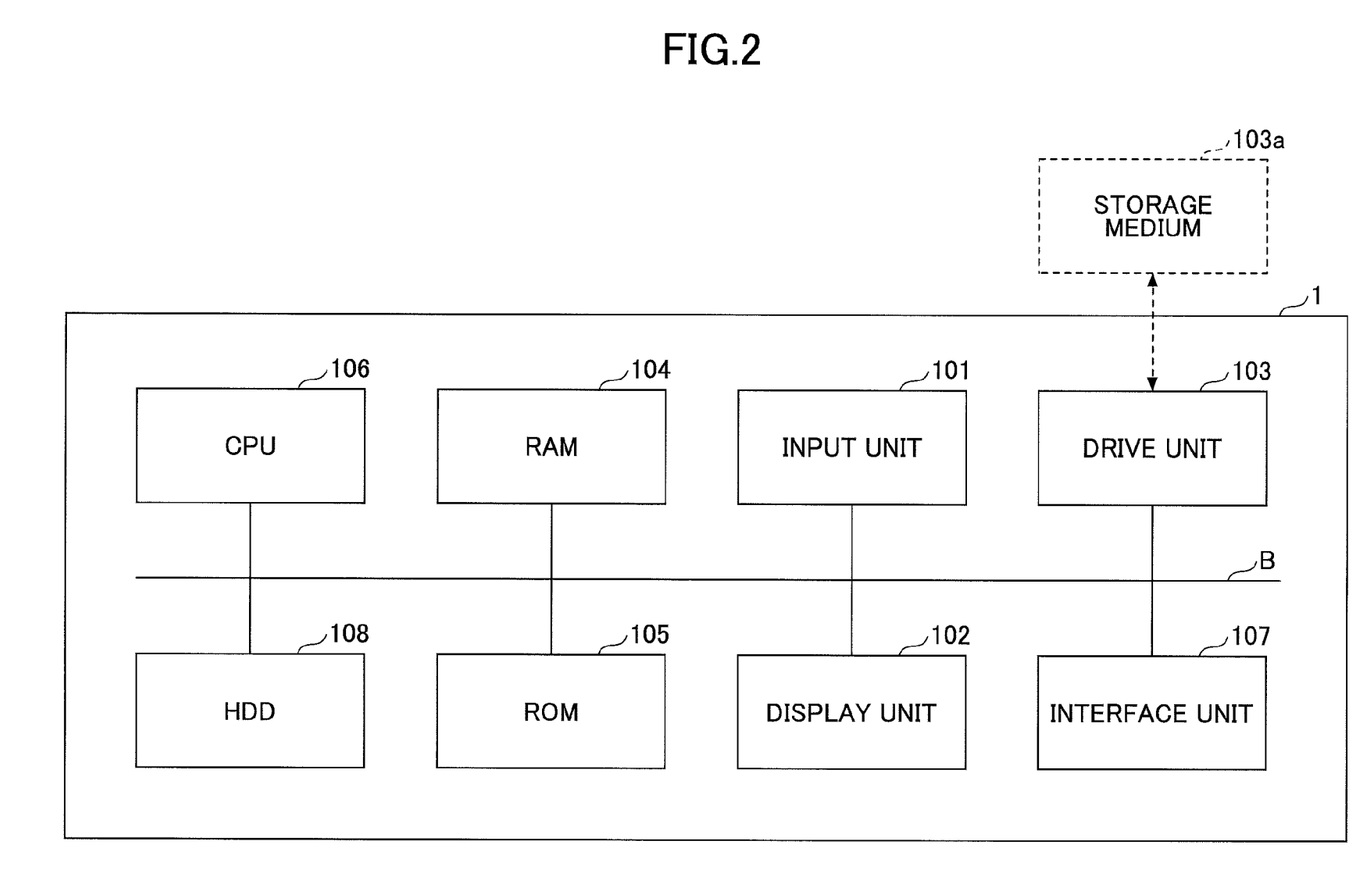
FIG. 2 is a block diagram illustrating an exemplary hardware configuration of an apparatus management device according town embodiment.

An exemplary hardware configuration of the apparatus management device 1 is described below. FIG. 2 is a block diagram illustrating an exemplary hardware configuration of the apparatus management device 1. As illustrated in FIG. 2, the apparatus management device 1 may include an input unit 101, a display unit 102, a drive unit 103, a random access memory (RAM) 104, a read only memory (ROM) 105, a central processing unit (CPU) 106, an interface unit 107, and a hard disk drive (HDD) 108 that are connected to each other via a bus B.

The input unit 101 includes, for example, a keyboard and a mouse, and is used to input instructions (or operation signals) to the apparatus management device 1. The display unit 102 displays, for example, processing results of the apparatus management device 1. The interface unit 107 connects the apparatus management device 1 to a network. The apparatus management device 1 can perform data communications with the apparatuses via the interface unit 107 and the network.

The HDD 108 is a non-volatile storage medium for storing various programs and data. For example, the HDD 108 stores basic software (e.g., an operating system such as Windows (trademark/registered trademark) or UNIX (trademark/registered trademark)) for controlling the entire apparatus management device 1, and applications that are executed on the basic software to implement various functions (e.g., apparatus management functions). The HDD 108 may manage the stored programs and data using a file system and/or a database (DB).

The drive unit 103 is an interface between the apparatus management device 1 and a removable storage medium 103a. The apparatus management device 1 can read and write data from and to the storage medium 103a via the drive unit 103. Examples of the storage medium 103a include a floppy (flexible) disk (FD), a compact disk (CD), a digital versatile disk (DVD), a secure digital (SD) memory card, and a universal serial bus (USB) memory.

The ROM 105 is a non-volatile semiconductor memory (storage unit) that can retain data even when the power is turned off. For example, the ROM 105 stores programs and data such as a basic input/output system (BIOS) that is executed when the apparatus management device 1 is turned on, and system and network settings of the apparatus management device 1. The RAM 104 is a volatile semiconductor memory (storage unit) for temporarily storing programs and data. The CPU 106 loads programs and data from storage units (e.g., the HDD 108 and the ROM 105) into the RAM 104 and executes the loaded programs to control the apparatus management device 1 and to implement various functional units of the apparatus management device 1.

With the above hardware configuration, the apparatus management device 1 can provide various functions and services for apparatus management.

As described above, in this embodiment, it is assumed that the apparatuses 11, 12, 13, 21, and 22 are digital multifunction peripherals (or image forming apparatuses) including functions of a scanner, a copier, a printer, and a facsimile machine whose hardware configurations are known. Therefore, illustrations and descriptions of the hardware configurations of the apparatuses 11, 12, 13, 21, and 22 are omitted.

<Functional Configuration>

Figure 3:
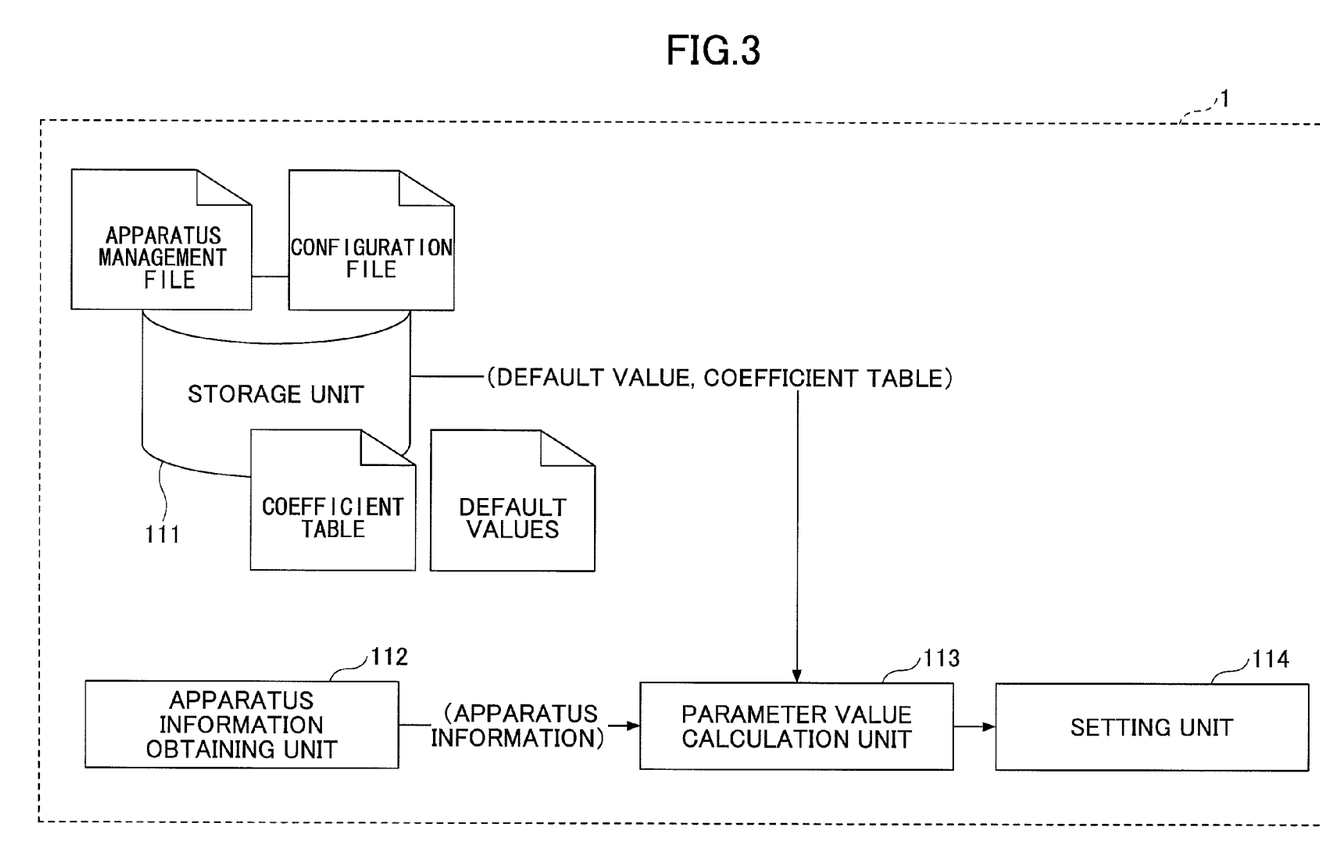
FIG. 3 is a block diagram illustrating an exemplary functional configuration of an apparatus management device according to an embodiment.

An exemplary functional configuration of the apparatus management device 1 is described below. FIG. 3 is a block diagram illustrating an exemplary functional configuration of the apparatus management device 1. As illustrated in FIG. 3, the apparatus management device 1 may include a storage unit 111, an apparatus information obtaining unit 112, a parameter value calculation unit 113, and a setting unit 114.

The storage unit 111 stores an apparatus management file, configuration files, default (or reference) values of parameters, and a coefficient table(s) including coefficients that are associated with counter values indicating the operational status of the apparatuses and are used to change the default values.

The apparatus management file is a data file including information necessary for the apparatus management device 1 to manage the apparatuses. For example, the apparatus management file includes apparatus names, model names (model numbers), IP addresses, and locations of the apparatuses in the managed site B. The configuration files are data files storing values specified for the parameters (or settings) of the apparatuses.

The default values are initial values or recommended values of parameters of the apparatuses. The coefficient table includes coefficients that are associated with counter values indicating the operational status of the apparatuses and are used to change the default values based on the counter values.

The apparatus management device 1 may obtain the default values and the coefficient table via the network from the remote management center A. At the remote management center A, the maintenance personnel routinely monitor and manage the apparatuses in the managed site(s) B, and obtain and accumulate apparatus information from the apparatuses. The default values and the coefficients may be determined and updated based on the accumulated apparatus information.

The apparatus information obtaining unit 112 obtains apparatus information from the apparatuses. The apparatus information of each apparatus may include an IP address, a MAC address, an apparatus name, a model name, and status information such as counter information (e.g., a counter value such as the number of pages printed) indicating the operational (usage) status of the apparatus and failure history information. A counter value in the apparatus information obtained from an apparatus (i.e., a counter value indicating current operational status of the apparatus) may be called a "current" counter value to distinguish it from the counter values in the coefficient table.

The parameter value calculation unit 113 refers to the coefficient table to obtain coefficients corresponding to the counter information obtained by the apparatus information obtaining unit 112 and calculates update values of the parameters by multiplying the default values by the coefficients.

The setting unit 114 sets the values of parameters of the apparatuses. For example, the setting unit 114 sets the parameters of the apparatuses at the update values calculated by the parameter value calculation unit 113. After the parameters are set at the update values (i.e., the parameters are updated), the apparatuses operate according to the update values. The values of parameters of an apparatus can be specified or changed individually, or can be specified or changed collectively using the configuration file.

The above described functional units of the apparatus management device 1 may be implemented, for example, by executing programs by the CPU 106.

<Apparatus Information>

As described above, the apparatus management device 1 can obtain, from each apparatus, apparatus information including an IP address, a MAC address, an apparatus name, a model name, and status information such as counter information and failure history information. Examples of the counter information and the failure history information are described below.

Figure 4:
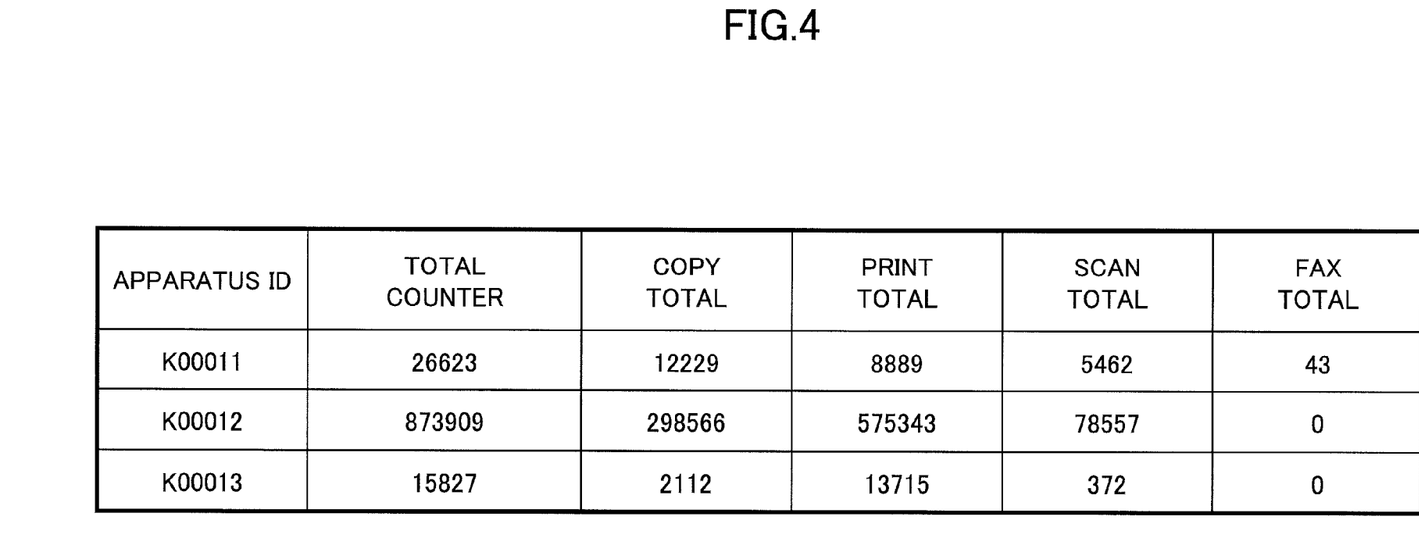
FIG. 4 is a table illustrating exemplary counter information.

FIG. 4 is a table illustrating exemplary counter information. FIG. 4 illustrates exemplary counter information in the apparatus information obtained from the apparatuses (multifunction peripherals) 11-13. The counter information includes the numbers of times that copy, print, scan, and fax jobs are executed (e.g., the numbers of pages copied, printed, scanned, and faxed). For example, the counter information of the apparatus 11 (apparatus ID; K00011) includes "Copy Total: 12229", "Print Total: 8889", "Scan Total: 5462", and "Fax Total: 43".

Figure 5:
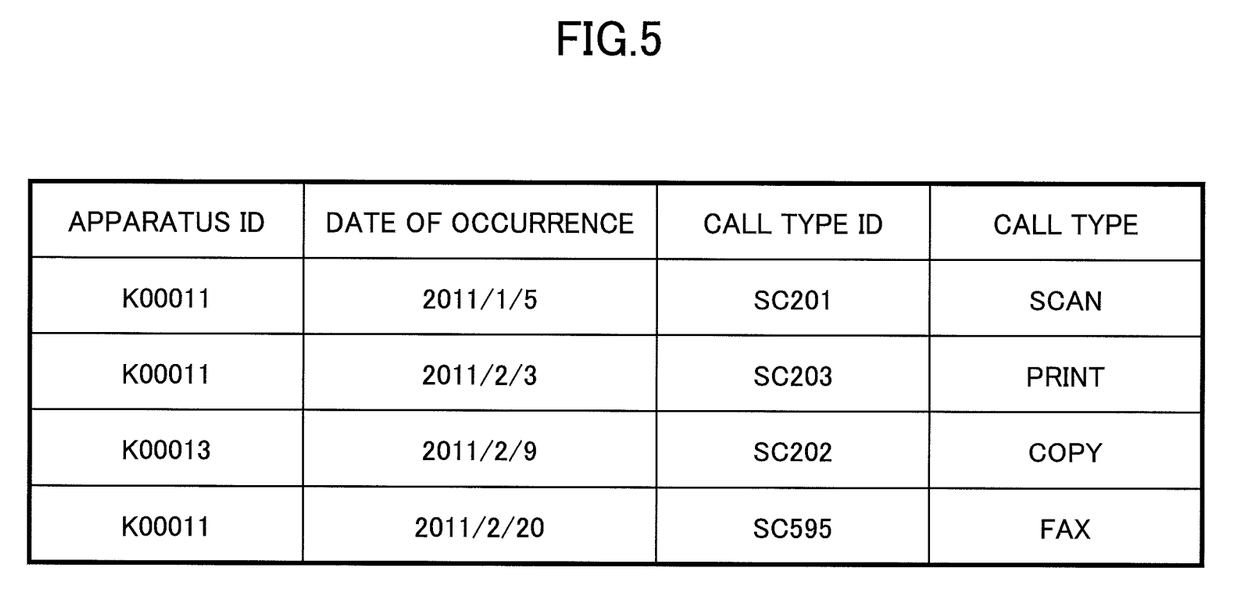
FIG. 5 is a table illustrating exemplary failure history information.

FIG. 5 is a table illustrating exemplary failure history information. In the apparatus management system 100, when a failure occurs in an apparatus, the apparatus sends a failure report (alert message) including a call type (or call type ID) indicating the type of the failure via the apparatus management device 1 or directly to the remote management center A. When receiving the failure report, the maintenance personnel remove the cause of the failure remotely or on-site. The apparatus sending the failure report records the failure as failure history information, and the apparatus management device 1 obtains the failure history information from the apparatus as an item of the apparatus information. According to the failure history information of FIG. 5, one scanning failure (indicated by "Scan"), one printing failure (indicated by "Print"), and one fax failure (indicated by "Fax") have occurred at the apparatus 11 (apparatus ID: K00011) and have been reported to the remote management center A. No failure has occurred at the apparatus 12 (apparatus ID: K00012). One copying failure (indicated by "Copy") has occurred at the apparatus 13 (apparatus ID: K00013) and has been reported to the remote management center A.

<Coefficient Table>

Figure 6:
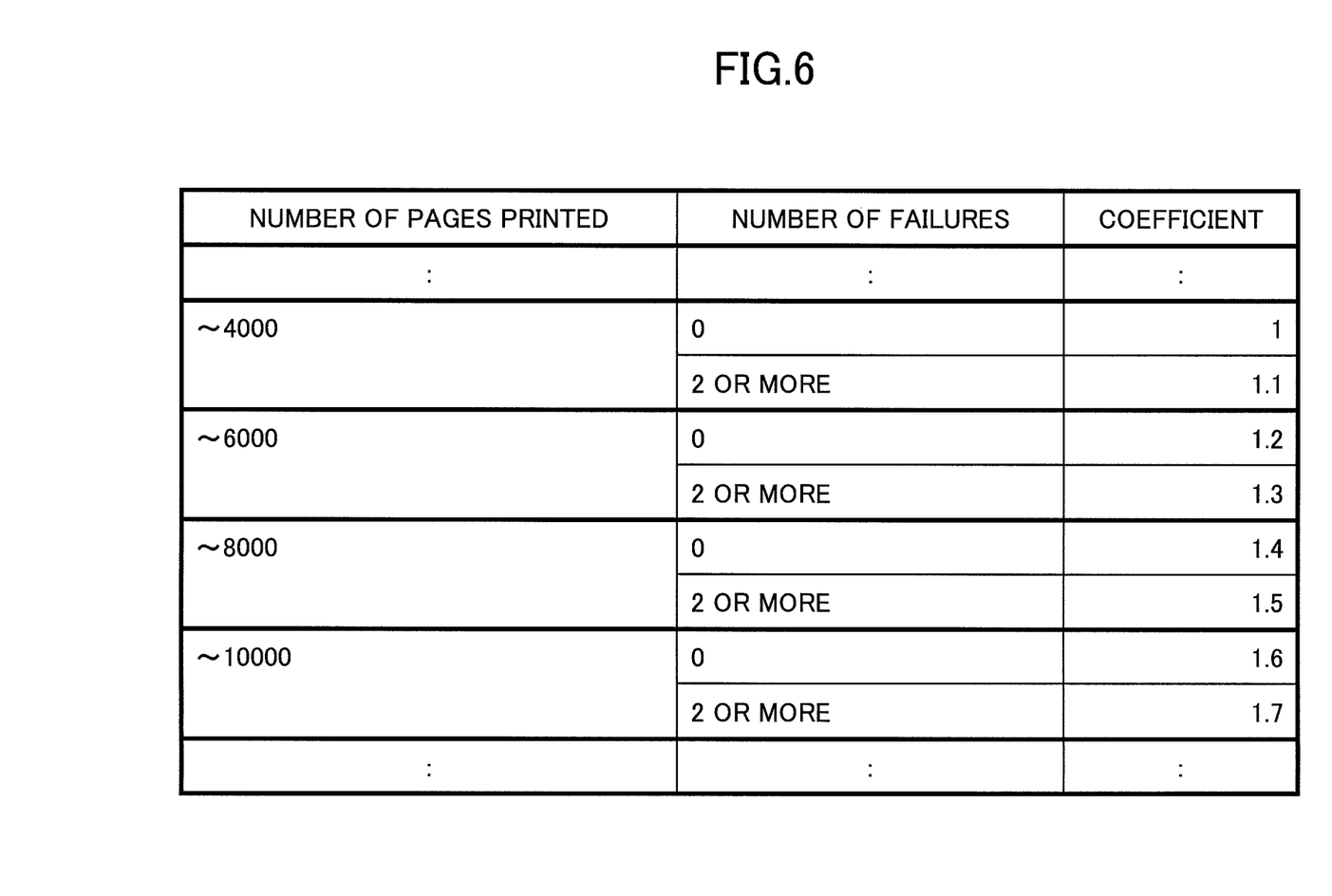
FIG. 6 is a drawing illustrating an exemplary coefficient table for a printing function.

As described above, the coefficient table is obtained from the remote management center A and stored in the storage unit 111. When evaluated based on the status information after a certain period of time from when the apparatuses are put into operation, the initial values (or default values) of the parameters of the apparatuses may be inappropriate. The coefficients (change ratios or correction ratios) in the coefficient table are used to change (or correct) the values of parameters of the apparatuses to more appropriate values, after a certain period of time from when the apparatuses are put into operation.

FIG. 6 is a drawing illustrating an exemplary coefficient table for the printing function. The coefficient table for the printing function may include a "number of pages printed" field, a "number of failures" field, and a "coefficient" field that are associated with each other. For example, according to the coefficient table of FIG. 6, when the number of pages printed is 4000 and the number of failures is 0, the coefficient is 1.

The number of pages printed may be obtained from "Print Total" in the counter information of FIG. 4, and the number of failures may be obtained from the failure history information of FIG. 5. For example, when the value (counter value) of "Print Total" is 4000 and the number of failures in the failure history information is 0, the coefficient is 1. As another example, when the value of "Print Total" is 4000 and the number of failures in the failure history information is 2, the coefficient is 1.1. The coefficient is used to multiply the default values of parameters to obtain update values that are to be specified for the parameters after a predetermined period of time from when the apparatus is put into operation.

<Default Values>

Figure 7:
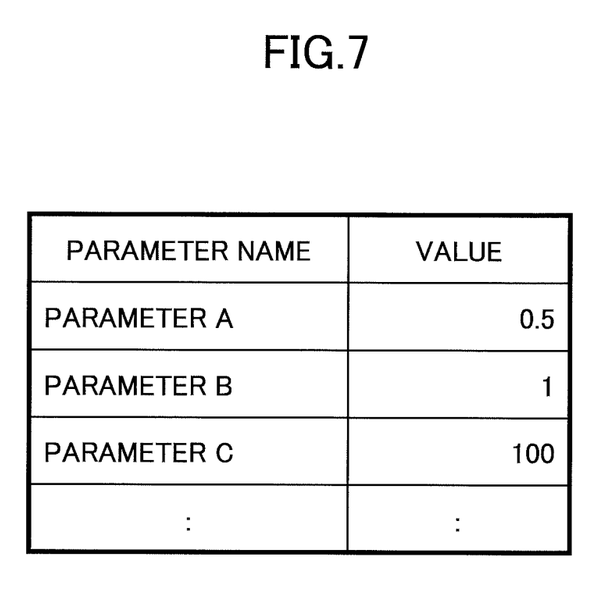
FIG. 7 is a table illustrating exemplary default values.

FIG. 7 is a table illustrating exemplary default values. As illustrated in FIG. 7, a default value is defined for each parameter (setting). As described above, the default values are obtained from the remote management center A and stored in the storage unit 111. At the remote management center A, the maintenance personnel routinely monitor and manage the apparatuses in the managed site(s) B, and obtain and accumulate apparatus information from the apparatuses. The default values are initial values or recommended values of parameters of the apparatuses, and may be determined and updated by the maintenance personnel based on the accumulated information on the apparatuses. Needless to say, different default values may be defined for different parameters.

<Configuration Process>

Figure 8:
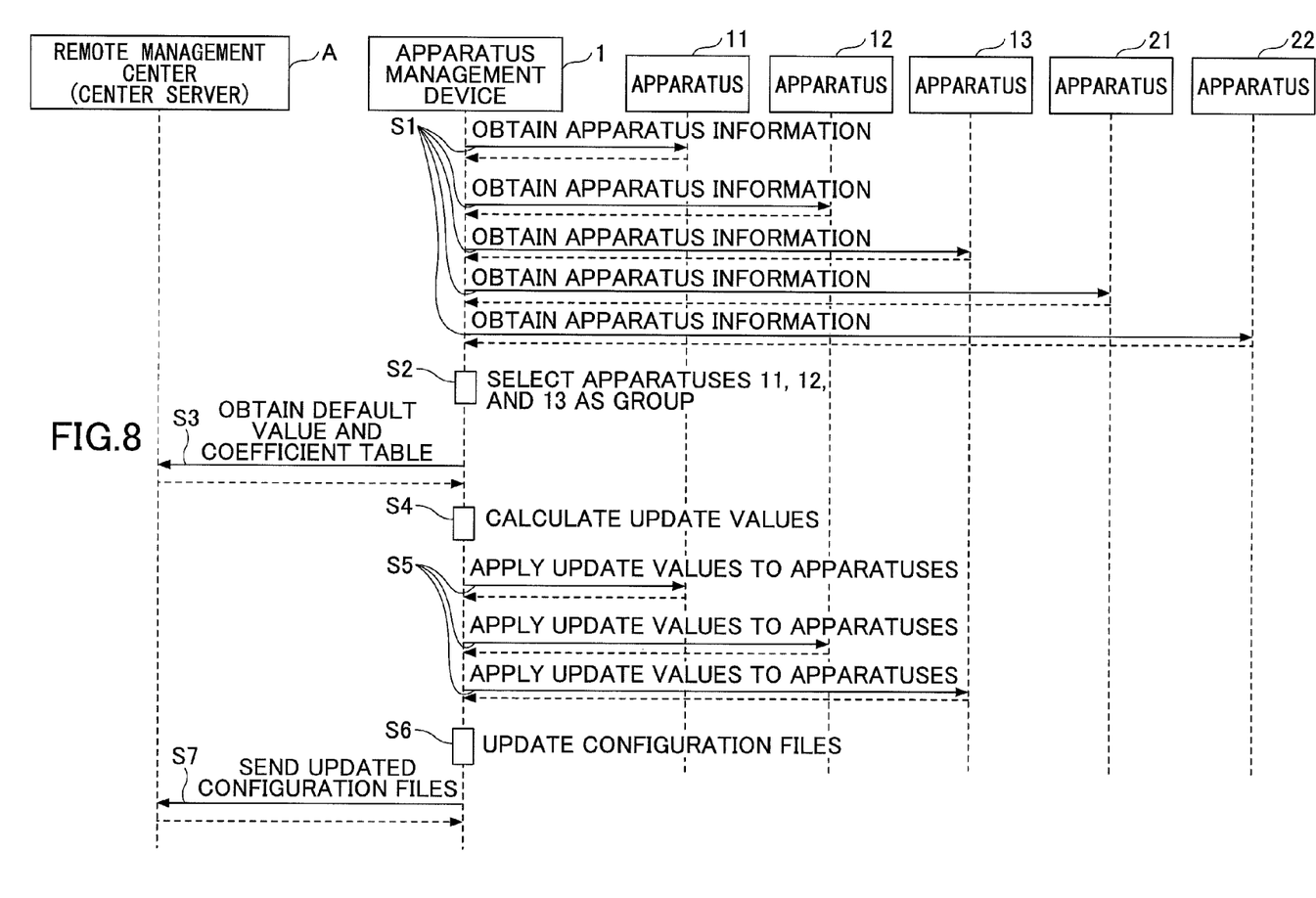
FIG. 8 is a sequence chart illustrating an exemplary process performed by an apparatus management device to configure apparatuses.

An exemplary process performed by the apparatus management device 1 to configure (or reconfigure) the apparatuses is described below with reference to a sequence chart of FIG. 8.

S1: The apparatus management device 1 (the apparatus information obtaining unit 112) obtains apparatus information from the respective apparatuses in the managed site B. In this exemplary process, it is assumed that the apparatus management device 1 obtains at least the counter information indicating the number of pages printed and the failure history information from the apparatuses to set the value of a "wait time between print jobs" parameter. For example, the apparatus information may be obtained using the SNMP or a proprietary protocol of the manufacturer.

S2: The apparatus management apparatus 1 selects one or more of the apparatuses in the managed site B as a group to be configured at the same time. The apparatuses to be placed in the group may be selected automatically by the apparatus management device 1 based on, for example, model names and locations in the apparatus management file or the apparatus information obtained in step S1. Alternatively, the administrator may manually select the apparatuses by operating the apparatus management device 1. In this exemplary process, it is assumed that the apparatuses 11, 12, and 13 of the same model are selected as a group and configured at the same time.

S3: Next, the apparatus management device 1 accesses the remote management center A to obtain a default value and a coefficient table (or reads the default value and the coefficient table from the storage unit 111). In this exemplary process, to set the value of the "wait time between print jobs" parameter, the apparatus management device 1 obtains the coefficient table for the printing function illustrated in FIG. 6 and the default value (0.5 sec.) of the "wait time between print jobs" parameter (parameter A) illustrated in FIG. 7.

S4: The apparatus management device 1 (the parameter value calculation unit 113) obtains coefficients corresponding to the counter information and the failure history information obtained in step S1 by referring to the coefficient table for the printing function obtained in step S3, and calculates update values by multiplying the default value obtained in step S3 by the coefficients. This step is described in more detail below.

In the descriptions below, it is assumed that the apparatuses 11, 12, and 13 were put into operation on Jan. 1, 2011 (operation start date) and the values of the "wait time between print jobs" parameter of the apparatuses 11, 12, and 13 are changed (or corrected) taking into account the status information after two months (Feb. 28, 2011) from the operation start date.

Based on the above assumption, update values for the "wait time between print jobs" parameter of the apparatuses 11, 12, and 13 are calculated.

Referring to FIG. 4, a "Print Total" of the apparatus 11 (apparatus ID: K00011) is 8889. Referring to FIG. 5, at the apparatus 11 (apparatus ID: K00011), one printing failure occurred on Feb. 3, 2011 during the two month period discussed therein.

Referring to the coefficient table for the printing function illustrated in FIG. 6, a coefficient "1.4" corresponds to the number of pages printed "8889" and the number of failures "1". Referring to FIG. 7, the default value of the "wait time between print jobs" parameter (parameter A) is "0.5". Therefore, an update value for the "wait time between print jobs" parameter of the apparatus 11 is "0.5" (default value)×"1.4" (coefficient)=0.7 sec.

Here, the wait time between print jobs indicates an interval between print jobs executed consecutively by a multifunction peripheral. In other words, the wait time between print jobs is time from the completion of a previous print job to the start of the next print job. As the wait time between print jobs decreases, the number of print jobs that can be executed within a time unit increases (i.e., the performance of a multifunction peripheral improves). Meanwhile, as the wait time between print jobs increases, the number of print jobs that can be executed within a time unit decreases (i.e., the performance of a multifunction peripheral is reduced). According to the coefficient table of FIG. 6, the default value "0.5" of the "wait time between print jobs" parameter is suitable for a multifunction peripheral that prints less than or equal to 4000 pages and whose number of failures is zero in two months. If the number of pages printed and/or the number of failures of a multifunction peripheral in two months is greater than these values, it is preferable to increase the wait time between print jobs to reduce the workload and prevent the failure of the multifunction peripheral. In this exemplary case, the apparatus 11 has printed 8889 pages and has failed once within two months. Therefore, the wait time between print jobs for the apparatus 11 is increased to 0.7 sec.

S5: The apparatus management device 1 (the setting unit 114) sets the parameters of the apparatuses at the update values calculated in step S4 (i.e., applies the update values to the apparatuses). In this exemplary process, the apparatus management device 1 sets the "wait time between print jobs" parameter of the apparatus 11 at 0.7. Similarly, the apparatus management device 1 sets the "wait time between print jobs" parameter of the apparatuses 12 and 13 at calculated update values.

S6: The apparatus management device 1 updates the configuration files of the apparatuses which are stored in the apparatus management device 1. In this exemplary process, the apparatus management device 1 updates the value of the "wait time between print jobs" parameter in the configuration file of the apparatus 11 to 0.7. Similarly, the apparatus management device 1 updates the values of the "wait time between print jobs" parameter in the configuration files of the apparatuses 12 and 13 to the update values.

S7: The apparatus management device 1 sends the updated configuration files of the apparatuses 11, 12, and 13 to the remote management center A. Here, it is assumed that the configuration files are also retained at the remote management center A for the management of the apparatuses.

<Variation>

In the above embodiment, the apparatus management device 1 obtains a default value from the remote management center A (S3) and calculates update values based on the obtained default value (S4). In a variation of this embodiment, update values are calculated based on the values of parameters (i.e., values currently specified for the parameters) in the configuration files stored in the apparatus management device 1. In the descriptions below, the method according to the embodiment is called a first method and the method according to the variation is called a second method.

Default values of parameters are determined and updated as necessary by the maintenance personnel at the remote management center A based on accumulated apparatus information. Therefore, the default values are normally used for the parameters of apparatuses when they are put into operation, and it is appropriate to calculate update values based on the default values.

In the second method, however, update values are calculated based on the values of parameters (i.e., values currently specified for the parameters) in the configuration files stored in the apparatus management device 1. The second method is particularly preferable when changing the values of parameters for the second time or later.

For example, assuming that the "wait time between print jobs" parameter of an apparatus is set at the default value "0.5" when the apparatus is put into operation and the default value obtained from the remote management center A after two months is still "0.5", an update value calculated according to the first method (i.e., 0.5 (default value)×1.4 (coefficient)=0.7) is the same as an update value calculated according to the second method (i.e., 0.5 (value in configuration file)×1.4 (coefficient)=0.7).

However, when changing the value of the "wait time between print jobs" parameter after four months (i.e., for the second time), the default value obtained from the remote management center A may still be "0.5" while the value of the "wait time between print jobs" parameter in the configuration file (i.e., the value currently specified for the "wait time between print jobs" parameter) is "0.7". As a result, update values calculated according to the first method and the second method may become different from each other. For example, assuming that a coefficient "1.4" is identified based on the number of pages printed in the previous two months (the third and fourth months from the start of operation), an update value calculated according to the second method is 0.7 (value in configuration file)×1.4=0.98 while an update value calculated according to the first method is 0.5 (default value)×1.4=0.7.

Thus, according to the second method, the value for the "wait time between print jobs" parameter is changed to "0.7" after two months from the start of operation and is changed to "0.98" after four months from the start of operation. This means that the value of the "wait time between print jobs" parameter has been further increased by "0.28" taking into account the operational (usage) status of the apparatus during the third and fourth months. In other words, since the number of pages printed during the third and fourth months is still high, the value of the "wait time between print jobs" parameter is further increased by "0.28" to reduce the workload and prevent the failure of the apparatus.

Meanwhile, according to the first method, the value for the "wait time between print jobs" parameter is changed to "0.7" after two months from the start of operation and remains at "0.7" after four months from the start of operation. Thus, according to the first method, when the operational (usage) status during the third and fourth months is substantially the same as the operational (usage) status during the first and second months, the same update value (i.e., 0.7) is calculated for the "wait time between print jobs" parameter. In other words, the first method gives weight to (or relies on) the default values determined and updated by the maintenance personnel based on the accumulated information on the apparatuses.

<Summary>

As described above, the apparatus management device 1 of the above embodiments obtains apparatus information including status information (e.g., counter information and failure history information) from apparatuses, calculates update values of parameters (settings) of the apparatuses based on the status information, and applies the update values to the apparatuses (i.e., reconfigures the apparatuses). This configuration makes it possible to specify or change the values of parameters to suit respective apparatuses based on the operational status and/or the usage status of the apparatuses, and thereby makes it possible to reduce or prevent problems in related-art technologies where the same values are specified for the parameters of all apparatuses.

In the above embodiment, the number of pages printed (or the number of times print jobs are executed) is used as an example of counter information indicating the operational (usage) status of an apparatus, and an update value of the "wait time between print jobs" parameter is calculated based on the number of pages printed and a default value for the "wait time between print jobs" parameter. As other examples, an update value of a "wait time between copy jobs" may be calculated based on the default value and the number of pages copied (or the number of times copy jobs are executed), an update value of a "wait time between scan jobs" may be calculated based on the default value and the number of pages scanned (or the number of times scan jobs are executed), and an update value of a "wait time between fax jobs" may be calculated based on the default value and the number of pages faxed (or the number of times fax jobs are executed).

The above described embodiments may also be applied to a method, a system, a computer program, and a storage medium storing the computer program.

An aspect of this disclosure provides an apparatus management device, an apparatus configuration method, and a non-transitory computer-readable storage medium that make it possible to specify or change the values of parameters to suit respective apparatuses based on the operational status and/or the usage status of the apparatuses after a predetermined period of time from when the apparatuses are put into operation. The present invention is not limited to the specifically disclosed embodiments, and variations and modifications may be made without departing from the scope of the present invention.

What is claimed is:

1. A method performed by an apparatus management device connected via a network to a remote management apparatus and a plurality of managed apparatuses, the method comprising:

obtaining apparatus information from the managed apparatuses;
grouping two or more of the managed apparatuses based on the obtained apparatus information;
obtaining, from the remote management apparatus, current parameter values currently set in the managed apparatuses and coefficients associated with the apparatus information;
updating the current parameter values of the grouped managed apparatuses based on the obtained apparatus information and the coefficients; and
sending the updated current parameter values to the grouped managed apparatuses and the remote management apparatus.

2. The method as claimed in claim 1, wherein
the apparatus information includes identification information and locations of the managed apparatuses; and
the grouping is performed based on at least one of the identification information and the locations of the managed apparatuses.

3. The method as claimed in claim 1, wherein in the updating, the current parameter values of the grouped managed apparatuses are updated by multiplying the current parameter values by the coefficients corresponding to the apparatus information of the grouped managed apparatuses.

4. The method as claimed in claim 1, wherein the updated current parameter values are shared by the apparatus management device and the remote management apparatus.

5. An apparatus management device connected via a network to a remote management apparatus and a plurality of managed apparatuses, the apparatus management device comprising:

a memory that stores a program; and
a processor that executes the program to perform a process including
obtaining apparatus information from the managed apparatuses;
grouping two or more of the managed apparatuses based on the obtained apparatus information;
obtaining, from the remote management apparatus, current parameter values currently set in the managed apparatuses and coefficients associated with the apparatus information;
updating the current parameter values of the grouped managed apparatuses based on the obtained apparatus information and the coefficients; and
sending the updated current parameter values to the grouped managed apparatuses and the remote management apparatus.

6. The apparatus management device as claimed in claim 5, wherein
the apparatus information includes identification information and locations of the managed apparatuses; and
the grouping is performed based on at least one of the identification information and the locations of the managed apparatuses.

7. The apparatus management device as claimed in claim 5, wherein in the updating, the current parameter values of the grouped managed apparatuses are updated by multiplying the current parameter values by the coefficients corresponding to the apparatus information of the grouped managed apparatuses.

8. The apparatus management device as claimed in claim 5, wherein the updated current parameter values are shared by the apparatus management device and the remote management apparatus.

* * * * *